United States Patent
Cross

(10) Patent No.: US 10,298,986 B2
(45) Date of Patent: May 21, 2019

(54) METHOD AND APPARATUS FOR INCORPORATING WEB BASED SELECTION INTO GRAPHICS SYSTEM

(71) Applicant: Andrew D. J. Cross, San Antonio, TX (US)

(72) Inventor: Andrew D. J. Cross, San Antonio, TX (US)

(73) Assignee: NewTek, Inc., San Antonio, TX (US)

( * ) Notice: Subject to any disclaimer, the term of this patent is extended or adjusted under 35 U.S.C. 154(b) by 0 days.

(21) Appl. No.: 15/810,023

(22) Filed: Nov. 11, 2017

(65) Prior Publication Data

US 2018/0139481 A1 May 17, 2018

Related U.S. Application Data

(60) Provisional application No. 62/421,374, filed on Nov. 13, 2016.

(51) Int. Cl.
| | |
|---|---|
| *H04N 21/2665* | (2011.01) |
| *G06F 17/30* | (2006.01) |
| *G06T 1/20* | (2006.01) |
| *H04N 21/2662* | (2011.01) |
| *G06F 16/95* | (2019.01) |

(52) U.S. Cl.
CPC ......... *H04N 21/2665* (2013.01); *G06F 16/95* (2019.01); *G06F 17/30861* (2013.01); *G06T 1/20* (2013.01); *H04N 21/2662* (2013.01)

(58) Field of Classification Search
CPC ............ H04N 21/2665; H04N 21/2662; G06F 17/30861; G06T 1/20
See application file for complete search history.

(56) References Cited

U.S. PATENT DOCUMENTS

| | | | | |
|---|---|---|---|---|
| 6,604,242 | B1* | 8/2003 | Weinstein | H04N 5/44513 348/E5.102 |
| 6,785,902 | B1* | 8/2004 | Zigmond | H04N 21/858 348/564 |
| 7,707,600 | B1* | 4/2010 | Ramanathan | H04H 20/12 348/432.1 |
| 2003/0237092 | A1* | 12/2003 | Suzuki | G06F 17/3087 725/40 |
| 2005/0210526 | A1* | 9/2005 | Levy | H04N 7/17318 725/113 |
| 2007/0282925 | A1* | 12/2007 | Son | G06F 11/1451 |
| 2015/0237416 | A1* | 8/2015 | Eyer | H04N 21/8133 725/32 |

* cited by examiner

*Primary Examiner* — Oschta I Montoya
(74) *Attorney, Agent, or Firm* — Bruce J. Clark

(57) ABSTRACT

A process and apparatus for incorporating web based selected material in real time into a graphics template in a graphics system to be rendered and mixed with a video signal and broadcast, by first selecting the material as a key value to be paired with a key name where said key name is associated with a key name in a preexisting graphics template prepared to receive key value data associated with the key name, assigning the selected material to the desired key name to create a key pair, retrievably storing the key pair, monitoring the graphics system for a change to at least one key value for a key name in a template to be rendered in the graphics system, retrieving at least one key value in a key pair, inserting the key value in the template corresponding to the key name in the key pair, rendering the template, mixing the template with a video signal, and broadcasting the mixed signal.

15 Claims, 11 Drawing Sheets

| Key | Name | Image | Key | Name | Image |
|-----|------|-------|-----|------|-------|
| 01 | WebKey 01 | ☑ | 07 | WebKey 07 | ☑ |
| 02 | WebKey 02 | ☐ | 08 | WebKey 08 | ☑ |
| 03 | WebKey 03 | ☐ | 09 | WebKey 09 | ☑ |
| 04 | WebKey 04 | ☐ | 10 | WebKey 10 | ☑ |
| 05 | WebKey 05 | ☑ | 11 | WebKey 11 | ☑ |
| 06 | WebKey 06 | ☐ | 12 | WebKey 12 | ☑ |

[Reset]

Fig.4

Key Value Selection In Host

Page Key Value Assignment Host Computer

Image Key Value Assignment

Send Process

Process In Target Computer Updating Databases In TC

METHOD AND APPARATUS FOR INCORPORATING WEB BASED SELECTION INTO GRAPHICS SYSTEM

This application claims the benefit of the filing date of provisional application No. 62/421,374 filed Nov. 13, 2016.

BACKGROUND OF THE INVENTION

Field of Invention

This invention relates to the field of interactive graphics updates within a video production system. More specifically it involves in the one mode selecting and mixing in real time selected content from the web into the output of a graphics and/or video production and broadcast system.

An integrated video mixer typically includes a graphics capability, although said graphics functionality might also be provided in a traditional video mixer with a stand-alone graphics system. Mixers will typically receive two or more video inputs from various video sources to produce one or more simultaneous video outputs for program or other purposes. It typically provides on screen monitoring at a Preview display to support previewing video sources and potential mixes before they are mixed into the program sent to an output, Program Out for display, including but not limited to broadcasting, recording, or streaming to the internet. Outputs are typically to at least a Preview output and a Program output.

It is desirable as one is viewing web content from the internet on the same or a separate computer to quickly select and send via a network or other connection a specific selected portion (text, graphics, the web page itself or other content) of the web page for utilization as a graphic object or in the composition of a graphic object intended for display in a predetermined fashion as part of the Program Out by a video mixer for broadcast, streaming over the internet or other use. There is no such known method or apparatus. For simplicity herein, the term "broadcast" is used to include not only transmission over the air or cable, but also local audience viewership, and any streaming or other distribution, whether over the internet, intranet or otherwise.

Current art allows feeding of direct streams only subject to user satisfaction prior to broadcast. They are limited to the original feed of the web content provider, and must be viewed for acceptance in that form, and if approved are subsequently available for display in that same form. Such feeds do not allow one to browse the internet and select and send portions or elements from a webpage for use within a graphic page or template, nor do it from another computer, and then send the result to the production system for display. Such systems as do provide any similar functionality need to be designed or customized for each specific data source to be used, and cannot freely be used to quickly select data from any web page, or out of any document system.

Products like VIDPRESSO allow for feeding such streams. These do not read the standard web pages. Instead they read raw TWITTER feeds, present the list of 'tweets', and then allow the user to approve or reject a feed to be displayed. Other graphics system directly interface with the feeds themselves (for example, RSS or XML data feeds) and display these in real time, or they access a URL to display one or more web pages on a video output. Other systems will read the web based content, but must be uniquely programmed for each different data source type that they are required to support.

Some other systems simply display web pages as rasterized images (rendered) onto video output. Normally these systems require a computer system and a scan converter (such as the MATROX HDMI-SCAN CONVERTER) which typically just clone the web page verbatim or select a sub-region of the page specified in advance to clone verbatim. These all have the same shortcomings, including not allowing the user selected portion to be shown in variable user designed page templates and formats.

Some graphics systems (such as CHYRON's NETBLUE ONLINE GRAPHICS SYSTEM) include a web interface with a graphics system. These, however, do not provide the ability to visit arbitrary websites for the purpose of using elements from such websites in pre-designed graphic elements for broadcast or streaming as does this invention.

This invention allows most elements of a typical page displayed in a standard web browser to be sent to air from any computer for immediate live or on-demand display in a graphics system using a pre-defined graphics page template associated with a browser plugin used to select the text or imagery. The invention works with most elements of any typical web page, not just a page specifically designed for such data feeds. Initial approval or rejection of the material as suitable for the desired purpose is implicit in the fact that the operator chose to select the text and send the result to air. The invention is flexible in that in an alternative mode certain pre-approval safeguards or choices can be included in the process before sending to air as desired.

The invention consists in one mode of a method using a template in a graphics system (whether an independent graphics system, or part of an integrated video mixer, or a combination of these or similar means) for receiving selections of text or graphics (images for example) and then rendering these into a rendered page and into the desired mix to be displayed on video Program Out, such that the selection is received and updated into one or more templates automatically on receipt. Utilizing code inserted into and compatible with standard browsers on a host computer, one or more selections of desired elements from the web page is made to correspond with a predesigned page template in a production display system typically operating on a target computer addressable on a network, for instance by network address such as an IP and port number. Thus the invention allows selection of specific text or graphics on a webpage, typically using mouse, stylus, touch or keyboard or other input means, to select and then send the selected element(s) to the graphics system either immediately or upon operator demand, said demand as typically indicated by a user input means such as selection of a menu item or keyboard shortcut or the like. Upon initiating the send action, the selection is sent from the host computer to the target computer utilizing a selected or desired network protocol to communicate. The target computer then sends the selection to the template having a corresponding key name to that paired with a key value, or proxy key value as may be the case, so as to insert the selected material (or locate and/or process and then insert the selected material using the proxy key value as the locator) automatically into the template or templates, which template is then rendered by renderer or the mixer's standard rendering module and then mixed with the other desired video sources, if any, to create and display automatically on the Preview and Program out live as desired.

In this manner, within moments of the operator selecting and sending desirable content from a webpage to the graphics system, said content is included as an element in a graphic ready for immediate preview and/or display or on demand display as part of the program output by the video mixer.

It is therefore an object of the invention to provide a method and apparatus to easily and quickly select desired text, imagery, video, audio, and/or other content from a standard web page in a standard web browser, and choose to send it into a graphics system for use in a video production environment.

It is a further object of the invention to easily and quickly select desired text or imagery from a standard web page in a standard web browser and choose to send it over an intranet or other network means to a video mixer or overlay system for use in a video production system.

It is a further object of the invention to easily and quickly select desired text or imagery from a typical web page in a typical web browser and choose to send it over an intranet or other network means to a mixer for use in a video production system with safeguards to remind the user before sending.

It is a further object of the invention to provide a method and apparatus for easily and quickly selecting desired text or imagery from a typical web page in a typical web browser and choose to send it over an intranet or other network to a mixer for use in a video production system to be inserted into a predesigned template designed for receiving such selections for use in a video production system.

It is a further object of the invention to provide a method and apparatus for easily and quickly selecting desired text or imagery from a typical web page in a typical web browser and choose to send it over a network connection to a mixer for use in a video production system to be inserted into a predesigned template designed for receiving such selections for direct input into a live broadcast, streaming output, or for recording, using a mixer or other video production system.

Other objects and features of the invention will be apparent from the disclosure herein.

DESCRIPTION OF THE DRAWINGS

FIG. 4 is a sample of a menu appearing on the host computer when assigning key names to selected material

DESCRIPTION OF THE PREFERRED EMBODIMENTS

The invention provides for selection of material from any generic page display system to be sent for display by a separate predesignated program. In the mode shown here the invention may be used to send content from web pages to a template based graphics system and operates using associated software modules on the same or separate computer systems connected by a network. 'Network' as used herein refers to either a public or private network, intranet, or intranet, wired or wireless.

Figure 1:
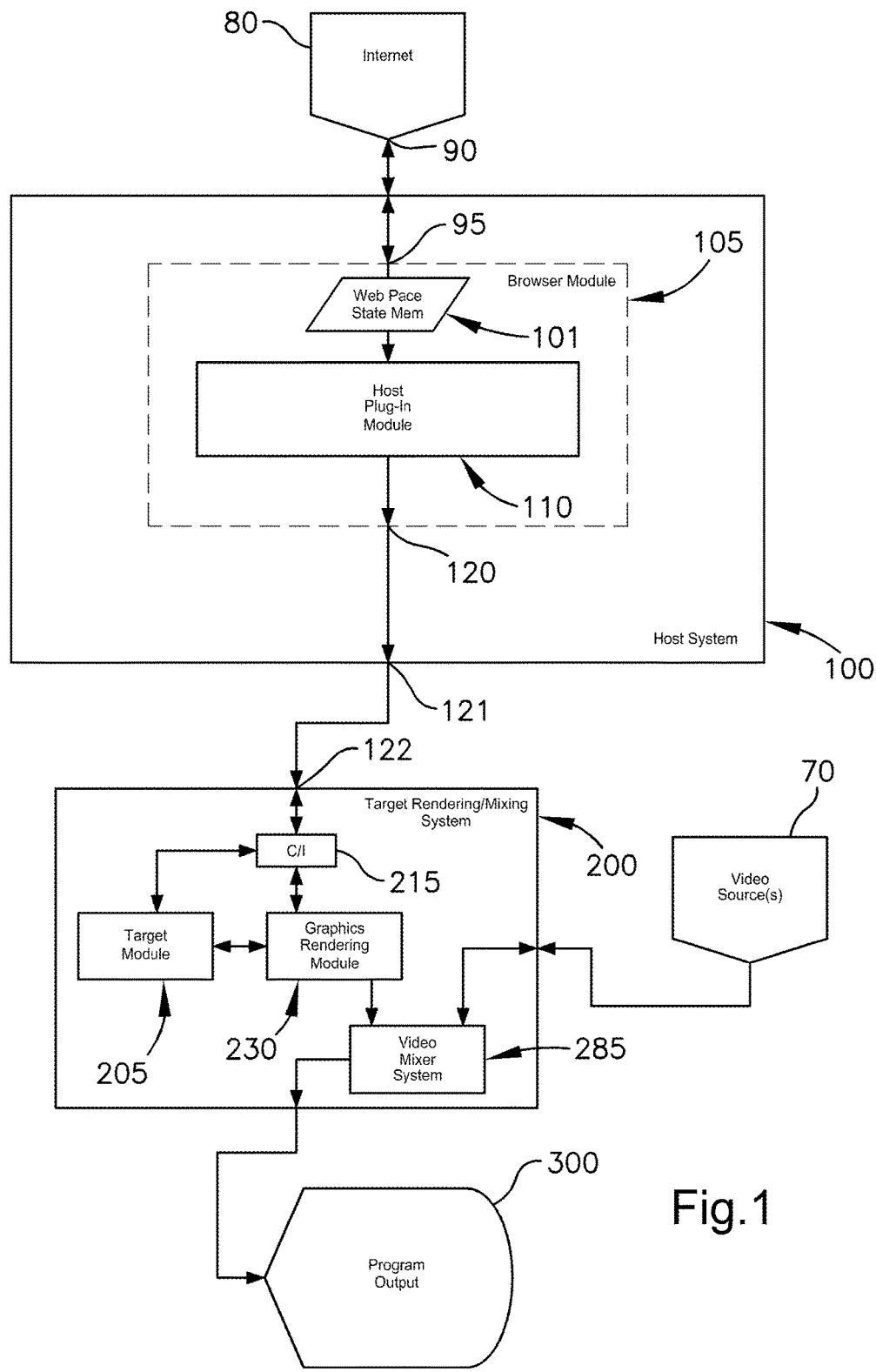
FIG. 1 is a block diagram of the overall system shown using a host computer and target rendering/mixing system

FIG. 1 shows these systems as the host computer 100 and the target rendering/mixing system 200, which can be a target computer. The target computer receives selected material from the host computer. Selected material refers to any selection desired in any format, including but not limited to text, graphics or other imagery, audio and/or video, data, and any desired additional properties determined by the user. The selected material may be from a web page and is typically displayed in a web page when using a web browser.

In the mode shown in FIG. 1, the target computer 200 is also referred to as the graphics computer, such as NewTek's TRICASTER integrated video mixing and production system that both renders and mixes, where the selected material is rendered, combined or mixed with other sources, such as the video source 70, to produce the desired Preview and/or Program Out at 300 for display and/or other broadcasting. For example, for many graphics operations, the combination operation will alpha composite a graphics template populated by the method described in this invention over a moving video frame.

At least two software modules are required for the process when used on different computer systems. One of the modules is a host module 110 for communicating with and operating with or within the host browser module 105 (the computer web page display program), with means for interacting with the user, including text and/or graphic object selection by the end user, or in another mode automatic recognition and selection of a specific data types on the webpage, and sending the selected material retrieved from the web state memory 101, to a target module receiving program 205 via communications interface in both systems (215 in the target computer) in the desired manner, including any additional selected material properties and/or confirmations desired. In this mode, the target module 205 will automatically receive the selected material information in a key pair message described hereafter, incorporate the selected material into a predesignated location by the graphics rendering module 235 to be rendered and mixed by mixer 285 with video source signal from source 270 and will be sent to output 285 for broadcast or display. Said predesignations for the selected material are commonly accomplished by use of a graphics template.

In a web based environment where the user desires to select text and/or graphics material from a web page on the host computer and display some or all of the material in a video production system, the target computer 200 is a computer that is capable of rendering graphics for use within a production system; in some cases the target computer would consist of an integrated production system wherein the rendering of graphics comprises just one function among many it provides, as for example one of NewTek's TRICASTER video production systems. The host plugin on the host computer consists of software code that runs in memory and is processed on the host computer with the generic display system software, which software is typically a standard web browser shown as software module 105 in FIG. 1. Such a browsers include GOOGLE CHROME or MICROSOFT INTERNET EXPLORER. The host module functionality could also be incorporated as a set of instructions as part of the browser itself, however in one mode it is a browser plugin, inasmuch as typical browsers allow for the inclusion of plugins, whether prepared by third parties or otherwise, to interact with their respective browsers and page content. This functionality could also be implemented by embedding a web browser within software code that observes and/or augments said functionality to provide web page selection and operations required to transfer said selections to a graphics system over a network connection.

Figure 2:
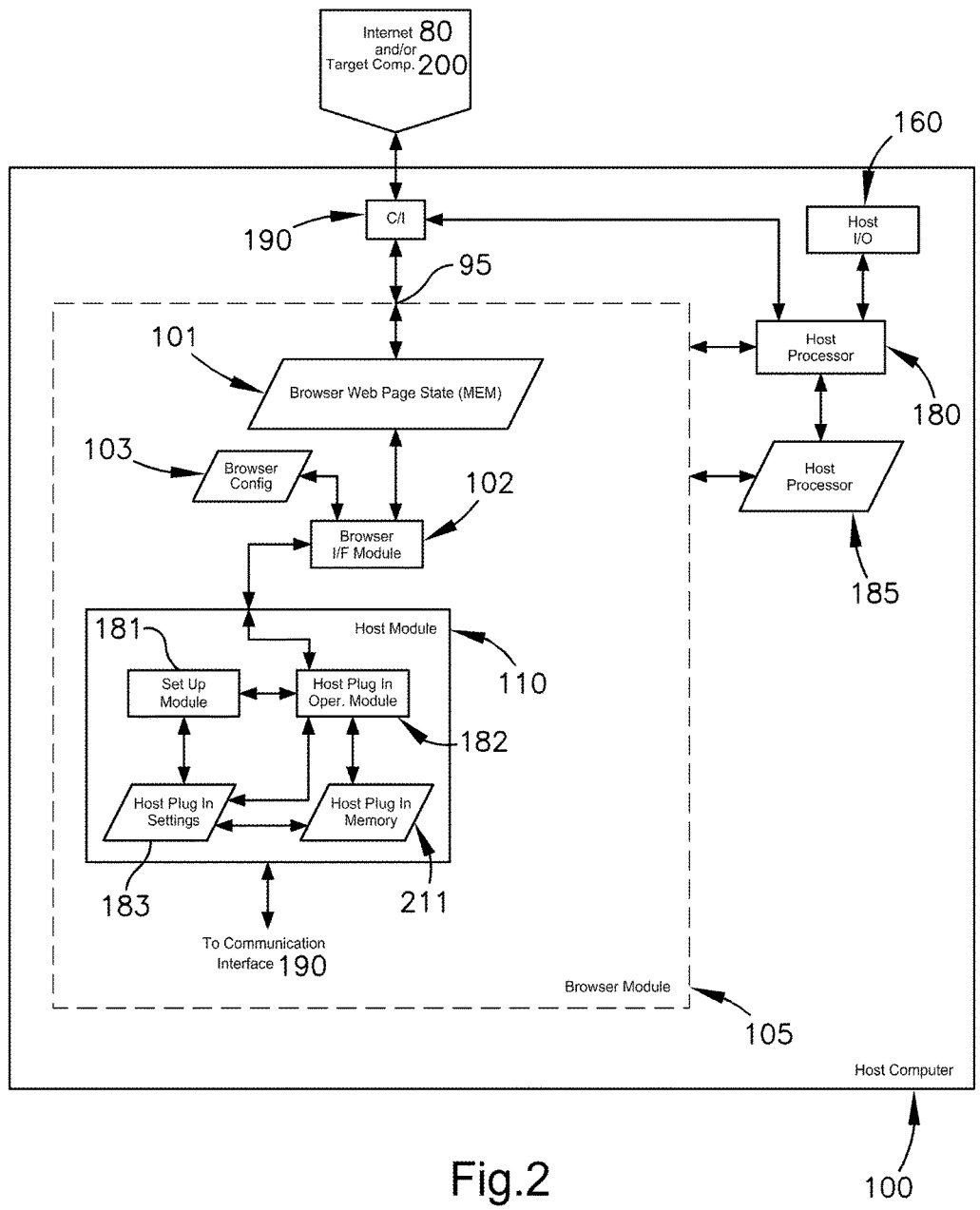
FIG. 2 is a more detailed view of the host computer in FIG. 1, with modules and information flow

FIG. 2 shows the host computer in more detail. The web browser 105 monitors and retrievably stores much of the information about the web page being displayed in one or more accessible memory addresses in web state memory 101, which information is collectively referred to here as the web state or web state memory 101. The browser will either provide such data to the plugin or allow the plugin access to the data as and when requested by the plugin.

Host plugin module 110 has several key modules within that operate in processor 180, utilizing system input/output 160 and communications interface 190 and memory/storage modules 185. The host plugin module 110 in this mode contains the software instructions, stored in the host computer, operated on by processor means of the host computer in response to operator input at computer keyboard, mouse, touch, gesture or other input means and in operation is called up and operates with or 'within' the host browser. Instead of responding to manual operator input, it can be automatically based on predetermined criteria for selection. The plugin module 110 has in one mode components 181, 182, 183 although these can be combined or added to as additional modules and features are envisioned to enhance the operation and use. Setup module 181 has the instructions necessary to initialize, set up, configure, store and modify the special plugin settings, i.e. configuration of the plugin for the browser configuration needs stored in 103 as well as the plugin configuration needs stored in plugin configuration 183, all within the browser constraints as well as target computer information requirements. Operating module 182 contains in one mode instructions used during the selection process and other module processes. These include collecting the desired selected material, manipulating it or directing the manipulation, for sending to the target computer in accordance operator choices, either predetermined in the configuration or during the process. The operating module 182 communicates with the browser 105 through the browser interface module 102 that allows access to the various browser functions and features. Although these browser functions are often proprietary to the browser, they are represented as browser interface module 102, browser web page state 101. Certain plugin settings may be stored in the browser configuration 103.

Figure 3:
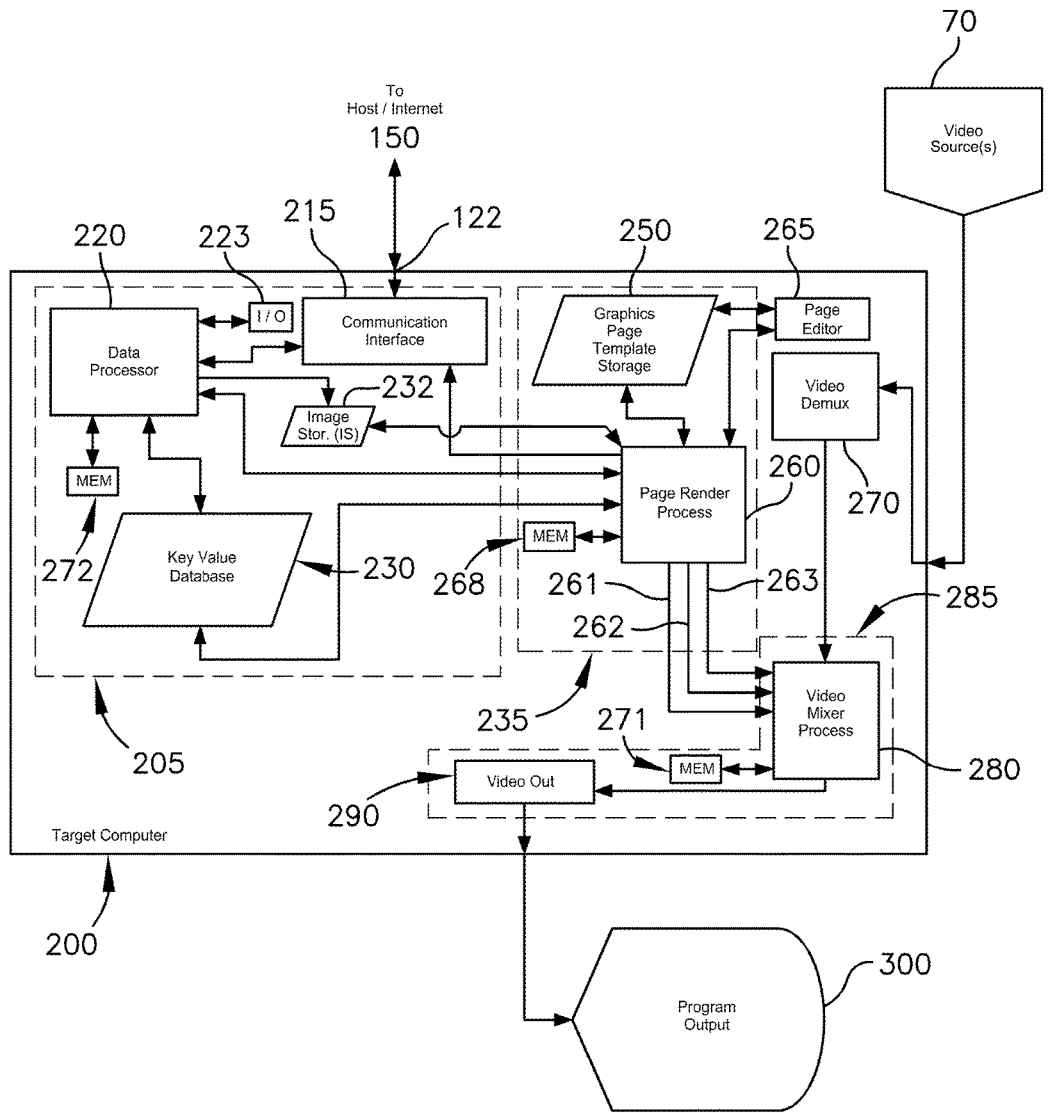
FIG. 3 is a more detailed view of the target computer as an integrated video mixing and productions system with graphics renderer and included target module with component software modules

The communications interface module 190 encodes the selected material information into a format suitable for transmission over the desired communications network using the network communications protocol, and in one mode can communicate over a TCP/IP interface on a network with the graphics computer identified by IP address and port number corresponding to the target computer and its corresponding communication interface 215 in FIG. 3. It is connected to the internet/intranet 80, for communication with the target computer 200, or could be connected directly to the target computer communicating with its communications interface 215 at 150.

It is possible that the material information may itself be acted upon or first manipulated in a manner the user desires for display (such as spell checking, obscenity checking, etc.) or as required for communications purposes, such as protocol modifications). This premanipulation can be done either at the host computer or the target computer.

The two communications modules 190 and 215 are thus associated so as to be able to communicate with each other, although in one mode it is not necessary for the target module to communicate with the host plugin. In another mode, the target module may send page or template data to the host plugin to allow the user to easily update the user menus in the host plugin to make certain page target selections before sending. The data being sent might either be the content or modified content from the page itself, or a reference to that content so that the graphics system is able to directly fetch the selected data; in this mode meta-data that augments the data reference might be included and can be, but is not limited by, page URL, selected elements and website user or login information.

In another mode, the selected material might be processed before transmission, for example by first changing the font or the graphic or as otherwise desired.

FIG. 3 shows in one mode the target system 200 having target module 205, graphics rendering module 235, and video mixer and production system 285. Page editor 265 can also be a separate program communicating with the graphics module 235. In this mode all are operating on the same target computer, particularly useful in a video production environment, although such integration is not necessary if all relevant parts are communicatively interconnected.

Target module 205 is comprised in this mode of a communications interface 215 (although it can utilize the computer system's communications interface) processor 220, key value database 230, input/output means 223, and image storage means 232. Memory 272 stores any information not specifically designated for use by the processor 220. Target operating module 272 has the necessary software instructions operated on by the processor 220 to carry out the instructions set forth herein for the target module.

The communications interface module 215 receives the communication from the network via the target computer 200 communications port at 122, which can be a standard communications port identified herein. In a network or IP environment, it uses the target computer's IP and port address identifier and the host target computer's IP and port identifier for addressing and communications with the host computer and host plugin. This module extracts the message and can parse the necessary selected material information and sends it to the data processor 220 for any desired processing by the operating module 272, or the module 272 can perform the parsing to obtain the key pair and key value (or key value proxy, as will be seen).

The target operating module 272 is a standard data processor program such as the open source software SQLITE or REDIS that allows creation of key value names through input from the target computer keyboard by the operator or other means as desired (including key names being read in from a file directly by the currently selected graphic template) and stores those names in the key value database 230. It also recalls, upon receiving key values from the communications interface 215 received from the plugin, key value names to associate with the received key values, creating key pairs that it transmits to the page render processor 260. It also can distinguish in the message from the communications interface 215 whether an image is received or a URL or other reference meta-data received and, in the former case, send the image to the image storage 232, or in the latter send the URL or meta-data as a key value (i.e. proxy showing where the image can be found for a key number) to the key value database. It also communicates with the page renderer 260 to let the page renderer know that new key values or new imagery is available to instruct the renderer processor 260 to obtain said new key values or images for its template and rendering. The module 272 also configures and sets up the target module within the target computer to operate within the needs and requirements of the other modules and the target computer itself. While this mode is commonly used with text and images as selected material, it might include other forms of data such as video, audio and other data.

The key value database 230 is a collection of the key names retrievably stored in an accessible storage device typically on the target computer which is commonly, but not limited to, memory, and is commonly backed up to a hard drive or other permanent storage system. The storage means may be internal to the target computer or may be a remotely accessible hard drive or other storage means in another computer, or standalone, so long as the hard drive/storage means has processor means for controlling the input and output to the storage.

Key names are identifiers in page templates to receive key values that will vary, which identifiers are identified by predesignated identifier characters (such as a percent sign). For example, one common way of doing this is to use an identifying character sequence to indicate key names; an example would be to use a percent sign at the beginning and end of a name that may have variable values, such as "% TITLE %" or such key names could be included in a larger text string, such as "The name of my page is % TITLE %". The key value database stores these names. These key names are those that are inserted into or represented by other means (for example by index) in the page templates saved in the graphic page template database 250 using the page editor discussed hereafter. They may be manually saved in the key value database by the operator through the database processor, or may be inserted automatically when creating and/or saving page templates or template revisions, by connecting the key value database to the page editor 265 and/or the graphic page template 250. Key value names are matched with new key values by the host computer to create key pairs used in the process. Key pairs may be stored in the key value database. Key pairs include the key value, or information as to where the key value (selected material) may be obtained.

The image storage 232 stores at least temporarily any images received in bitmap, compressed or uncompressed, or other format, where the URL to the image is not available directly from the webpage or otherwise not selected to be used for access to the image. It is also desirable to store images in certain database more easily accessed by a graphics package. In this case, the address of the image is sent to the key value database to be paired with the key name, instead of the key value image itself, and the image itself is transmitted to the graphics system when addressed as needed. The images thus received are retrievably stored as received from the data processor 220 and accessible for rendering by the renderer. They might be stored permanently, cached or only accessed when needed by the rendering process.

The graphics rendering 235 is a standard graphics rendering program such as TRICASTER TITLE TEMPLATES by NEWTEK (the page editor however may be a separate standalone package). It receives information from sources and renders them into a page template to create a rendered page for display in a video signal, and is comprised of at least a page rendering processor 260 and graphics page template storage module 250. Rendering processor module 260 utilizes the computer processor 220 in one mode, or may also employ as an alternative its own standalone processor to process the instructions. It has graphics page template storage module 250 utilizing system storage. It accesses user selected page templates having key names, replaces those key names with key values as appropriate and renders that page with new key values into a complete updated rendered page ready for mixing and overlaying on video signal. Page Editor is a separate module or package that allows editing pages to create the templates, described hereafter.

Page renderer 260 allows for an external instruction to update one or more pages that it is currently rendering, so that it will, upon instruction from the data processor 220, obtain the appropriate new key pairs and/or image from the key value database 230, or from the key value proxy information therein. In an alternative mode, the page renderer simply repeatedly checks the database in order to know when values have changed and the page needs rendering with new key pairs. A further alternative is that the page renderer is continuously (repeatedly) re-rendering the page checking all key pairs in the database and reinserting them in the template, whether new or not.

It should be noted that in all processes described herein, it is envisioned that asynchronous operations will likely occur such that certain operations are performed in a manner best utilizing system resources, given some operations are slower than others.

The page render process module 260 is connected to the processor 220 and the graphics template to render pages as desired upon being notified from the processor, or the key values database 230 that key pairs are being sent. All templates are updated by the renderer that have been called into memory by the operator for rendering, to create rendered pages of different types desired at its output. Three such page outputs are shown at 261, 262, and 263. The mixer will mix these with the desired video source(s) 70, to create the desired video signal(s) to send to video output 290, which may have a preview output and a Program out 300 that broadcasts the program signal desired.

Page editor 265, is a standard page editor such as LIVETEXT by NEWTEK that allows the creation of templates to be stored in the graphics template database 250 or other permanent or temporary storage means. It allows the operator of the target computer to create page templates, and as desired here, page templates with key names inserted at desired places that will show selected material as desired in the video output. Selected material here refers to the selected data that is desired to be 'pulled' from the webpage and displayed or used in the desired place and format in the ultimate video output, and includes text, graphics or other data or information of any kind.

In the instant invention, the key names in the template are key names that correspond as desired with one or more key names used in the host plugin that are used to identify with selected material from the web page. The selected material assigned to a key name becomes the key value for that key name, and the key name/key value is sometimes referred to herein as the key pair.

In one mode, the key names used in the template are also shown as available on the host selection menu at the time of selecting material from the webpage, so as to allow a key name to be assigned to particular selected material from the webpage that is to be inserted eventually into the template for rendering and display in the video output of the mixer These key names used in the template are thus made available in the host plugin selection menu (context menu) referred to below, although it is also envisioned that a different key name could be provided in the selection menu that is more descriptive of what the task at hand is, so long as the different name is still associated with the desired key name in the template, such that the key names in the template are later replaced by the actual key values that are associated with each key name.

For example, the template might have a numbered key name as KEYNAME2 yet the host plugin or the target computer program or the database program may allow for renaming that key name on the host computer as PHOTO, so long as the two key names are associated at some step in the program/process such that the selected material (a picture for example) becomes the key value assigned to the key name KEYNAME2, so as to create the key pair that the graphics module will have access to so as to render the photo in the template at the location for KEYNAME2.

The video mixer and production system 280 has video inputs for receiving rendered pages signals, such as those at 261, 262, 263 and mixing them with other video source signals into one or more outputs at 290 for preview, or for broadcast, streaming, recording or other use at Program out 300.

Initialization and Setup.

For the process to be used, it is necessary to first have installed and set up the browser plugin in the host computer so that plugin can operate with and communicate with the host browser, and has the necessary operational information to communicate with the target computer (where the host and target are different systems).

More generally, certain options are only provided by the programmer of the browser having the necessary proprietary browser software information in advance. The typical browser 105 allows third party plugins to use its menu options in popup menus in integration with the browser using the browser software, as determined by the user input commands to the host computer, and to use other browser features, including certain communications features adapted for the host computer by the browser. It is also desired to have the browser notify the host plugin when a selection is made and for the plugin to save, manipulate and send the selected material. The browser process varies by browser but the process will typically bring up a series of screens for the operator to supply information about the plugin and user requirements discussed hereafter. Browsers also typically have the ability to render images, and that capability is utilized in one mode.

The user however must also setup the plugin itself for use of the process with the target computer and within the user's needs. This involves initializing and registering with the browser, and also setting up the Plugin, such as identifying the target computer and/or target module, to which any selected material is to be sent. For example, in the example of the GOOGLE CHROME browser, this plugin might be downloaded and installed from the GOOGLE PLAY STORE.

The process and invention includes the scenario where the two computers are the same, such that the plugin knows how to find and address the main module on that computer with the plugin module.

Specifically, the plugin is loaded into memory or other storage means on the host computer to standby for use when needed, or it may be loaded as needed from the web or another device. In this mode, when it is first loaded the host browser will initialize, i.e. setup, the host plugin by determining the settings and actions that are required for the plugin to work. Although different browsers vary, the following steps are performed in most browsers in the host computer system although their order might vary.

The host plugin will initialize what the browser requires to interact, or is desired, for the plugin to operate and communicate with the browser. This would include registering with the browser what visual "icon" that it would like, and where this might be displayed. Typically this icon would be used in the configuration page for the browser. The plugin will provide the browser with the user desired required security and access privileges required for operation. This includes informing the browser that the plugin will require access to certain content and information of the web page being displayed (selected material) whenever certain actions occur, in this case the request to process and/or send to the target computer. After the initial installation, each time the browser is called up the plugin will initialize and load its current configuration settings, in one mode stored in the respective configuration modules for the browser and the plugin, ensuring that any settings that a user had configured in a previous run of the system are restored correctly, thus avoiding the need for full configuration of the setup on each run.

Further to the setup, information is provided by the user that is registered in the configurations in a "settings" page on the host computer, and that allows the plugin and user to interact with the target computer/graphics system. The user to set up, provides, in one mode:

1. The IP address and port number of the target system are entered. The host plugin software may also provide an option to check by "pinging" the address and verifying that it is a correctly operating graphics system. In an alternative mode, the address of the target system might be discovered automatically using a network discovery protocol and methodology such as the multicast DNS for discovering devices on the network, commonly known as mDNS; when there is the option of having more than one target system on a network then a list of possible target systems might be presented to the user such that one or more might be selected.
2. The list of "key" names that the user wishes to be able to send actions into the graphics system under. Any such identifier can be equivalent to a key name. These key names match or are otherwise associated with corresponding ones in the key value database 230 in the target computer, and that are in one or more page templates in the graphic template database 250. The user will typically know in advance which key names are needed and how they are used in which templates. This list might be presented as one of a fixed number of elements but in one mode can be of configurable length. It is common that the names would have default values. For example, FIG. 4 shows a screen shot on the host computer provided by the Host plugin of key names provided with a plugin showing the key names (webkey01, etc.) that match the key names in the key value database 230, along with type of data (image for example) that the key name is associated with. In another mode, though, the user might choose at setup to change these so that for each line, and/or paragraph in the selection, a new key name is assigned. In one mode, each key name is provided by a user with a default selection provided.

At setup identifiers for each key name may also be assigned a type, such as—"image", "text", "audio", etc. FIG. 4 shows an option for identifying an image. While this is not required, this provides a checking process to assure that a user might not accidentally send an "image" to a "text" key or vice versa, where the selection is compared to the key during use. Otherwise the user might inadvertently produce incorrect graphics on output while in a video production. Filtering to get the proper key name types to avoid error might also be performed by the graphics rendering system in the target computer, or communicatively by both systems.

In the process of registering with the browser on setup, the browser identifies in accordance with browser created options the user interaction notifications needed. This includes notification when the browser needs access to the web page information usually stored in web browser state memory 101. When a user takes actions in most browsers, such as right clicking, the browser brings up a selection menu, referred to herein as a 'context menu,' that appears with options. The browser typically allows plugins to add or modify the browser context menus that appear in the browser to show the host plugin action as an option, such as an option to "SEND TO GRAPHICS COMPUTER" or "SETUP". It is possible and likely that other methods for accessing these functions are available, for instance keyboard shortcuts, gestures, button icons and more.

The plugin module when visible (such as by icon in the tool bar, or context menu, or hotkey) will query, i.e. read from the web page state memory 101, or the browser will provide as requested, all information regarding that selected data, i.e. selected material. For instance, if it is selected text, then it would get the information, such as text data selected, font information, and color from browser state 101. If it was a selected graphic element it would get the link to that imagery (URL), or might get the image itself in compressed or uncompressed form as discussed previously. If it was the entire page, it might request all data or imagery for that page, or it might instruct the web browser to render all or part of the page into a bitmap or other form. In one mode the plugin would install itself in the browser module to be visible, i.e. accessible, in the following scenarios:

1. When the user accesses the Context Menu in background. It would be visible on the context menu that is displayed when the user accesses the context menu from on the background of a web page with nothing selected. This is an option to the user as a way to send the full page as a single image to the graphics system. As a further option in one mode a 'sub menu' of selected key values pops up upon selection of the SEND TO GRAPHICS option, to allow the user to send the entire current page to a specific key value that is configured to receive an image. Any shortcut is envisioned to enable fast access to this operation, including a keyboard shortcut, or an icon on the tool bar, functioning as a user interface button, but is not limited to these means.

2. When the user brings up the Context Menu after highlighting text or on highlighted text. It would be visible on a context menu that is displayed when the user accesses the context menu when text is currently selected on the web page. As above, a further option in one mode, a 'sub menu' is used to allow the user to send the current page to a specific key value that is configured to receive a line of text. This submenu is part of the plugin software, displayed by the browser upon selection of the SEND TO GRAPHICS COMPUTER option. Any shortcut is envisioned to enable fast access to this operation, including a keyboard shortcut, or an icon functioning as a user interface button.

3. When the user brings up the context menu after highlighting an image, or as the context menu for an image directly. It would be visible on a context menu that is displayed when a user accesses the context menu from an individual image within a web page. As a further option in one mode a 'sub menu' created by the Plugin software, not the Browser, is displayed next to allow the user to send the current page to a specific key value that is configured to receive an image. Any shortcut is envisioned to enable fast access to this operation, including a keyboard shortcut, or an icon functioning as a user interface button.

In one mode, an option is allowed by the browser to add to at least one context menu to the "settings" panel for the plugin, thus allowing any configuration settings to be quickly accessed as needed; as an alternative an icon might be provided to access this functionality. Also in one mode, keyboard shortcuts are added in the browser, user defined within the browser requirements, and registered with the browser at installation. These registered keyboard shortcuts would allow a user to directly initiate the sending of web page data into the graphics system without the need to access a context menu.

Other options may be provided for user menu and other options at time of setup or by the plugin and target module programmer as described herein. In one mode, a reminder is utilized, such as to consider whether permission is needed before broadcasting a photo for example, such as "Permission needed first?" to which if the response is "no" then the next context screen or step towards sending is allowed. Other options, including the option to insert text, or copyright notices, are included as part of the processing of the selected material.

It also is necessary prior to operational use to have at least one template on the target computer with which the key values will be included for associated key names on that template, i.e. a predesigned template with key names associated with the key names in the host computer so that the key values selected in the host replace the corresponding key name in the template at the direction of the renderer. The page editor 265 creates templates, including the key names, data information and text information. The user simply creates a template page by typing in the desired key names with the identifying characters at beginning and end (or using any other database identifying structure), and locating these in the desired location with desired fonts, and other desired appearance characteristics. Some text or page properties might be provided by the browser plugin, for instance a formatted line of text might be sent that includes font and size information. Other page characteristics, backgrounds, etc. as desired are created. The page is saved and stored in the graphics pages template database module 250 with at least one key name that is used in the host plugin operating on the host computer.

Once setup is complete and the plugin configured, and any desired templates are created and available, the user is ready to interact and select from a webpage. In operation, when a typical browser is started and running to view web pages, it will load the plugins (or extensions) that are installed by the user on the system. As indicated, the host plugin is installed on the system, it would be loaded at this point.

The invention allows for several actions on the web page. In one mode, the selected material may be the text, an image, or the entire page, i.e. background.

Selection Process

Figure 5:
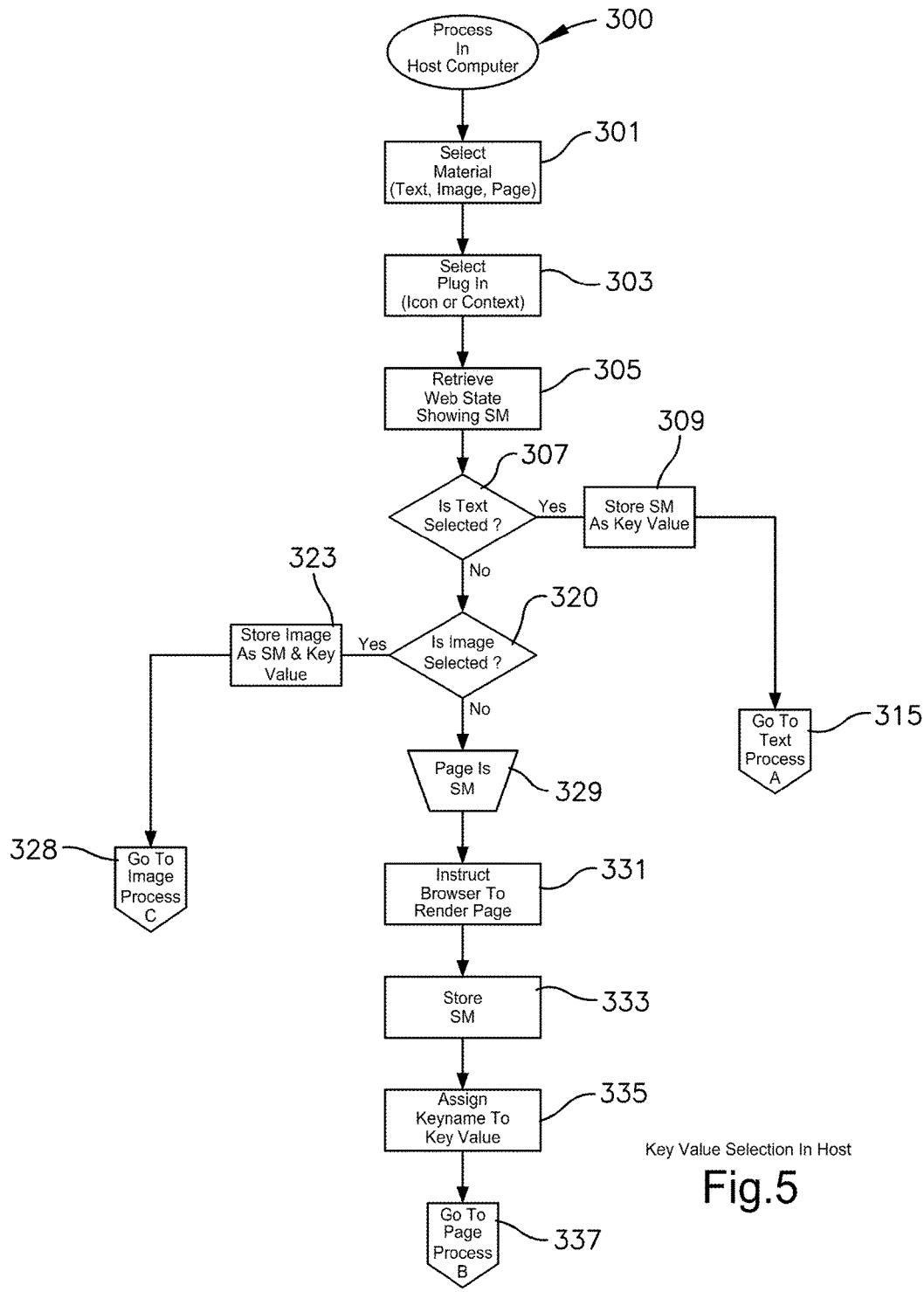
FIG. 5 is a flow chart of the selection and identification process in the host computer, and an example of assigning the key name before processing for an image

FIG. 5 shows the first steps in the process in this mode. When a user sees material on the web page that the user desires to insert in a broadcast, the user calls up the host plugin to do so by either selecting the material as is typical with selection and then right clicking. The user may also select the plugin icon from the tool bar. Whatever is in the web state memory for the selection is read as the selected material at 305, at least initially. If the user has not highlighted any selection on the page, then the entire page is the selected material, as that is typically what is in the web state memory 101.

The plugin software then determines whether it is text, or an image, or the page at 307. If text, then the text and all data stored pertinent to it in web state 101 is stored as the selected material at 309. The selected text is retrieved from the web state memory, and stored in a string variable or other storage format. The text or other selected material is normally recovered by the plugin making a call into the browser and obtaining it from browser state memory 101 to recover the selected text although some browser applications might provide this to the plugin when it is called as a parameter of the user interaction. There might also be associated metadata (e.g. bold, italics, font size, color, page name, weblinks, etc. . . . ) stored in or separately from these strings, also in browser state memory, which can also be retrieved with the text, if desired, all of which is the selected material for the key value to this point. The user might want to select components of the page that are associated with the selected text, for instance they might always wish to send an entire paragraph of data without highlighting the paragraph. If this is the case then the selected strings are modified to reflect all of the data that needs to be sent, potentially by choosing different data from the page.

If the selected material is an image, then the image is stored as selected material with pertinent data, at 323. If it is the entire page, then the page is instructed to be rendered, and the rendered page, with pertinent data, is the selected material at 333. Here the rendered page is also assigned to a key name and stored as a key pair at 337. In each case, the selected material may also be stored as the key value, ready to be assigned next to a key name, or after it is processed. In all cases, the selected material stored as a key value, even if paired with a key name, can be processed and the processed selected material can replace the key value if that is desired. Thus the final key pair will have the desired key value paired with the key name regardless of when the key value (or key value proxy) is processed.

It should also be noted that the selected material can be automatically processed and sent if the key name is always going to be the same for a session, for example where images will always go to one key name. This can occur with a predesignated shortcut key or other accelerator, as a button or gesture that calls up the host plugin automatically. The manual method is to bring up the context menu, for example, which is typically upon right click on the selected text/image, as discussed. Here, the plugin software is called up if the user selects "SEND TO GRAPHICS COMPUTER" (or other term inserted at setup). This starts a process to either create and build the message and send per settings in the plug in configuration, or bring up sub screens, or context menus with options discussed hereafter.

The next steps are dependent on whether the selected material is text, image or page, as referenced at 315, 337 or 328.

Interacting with the Text Elements on a Page.

Figure 6A:
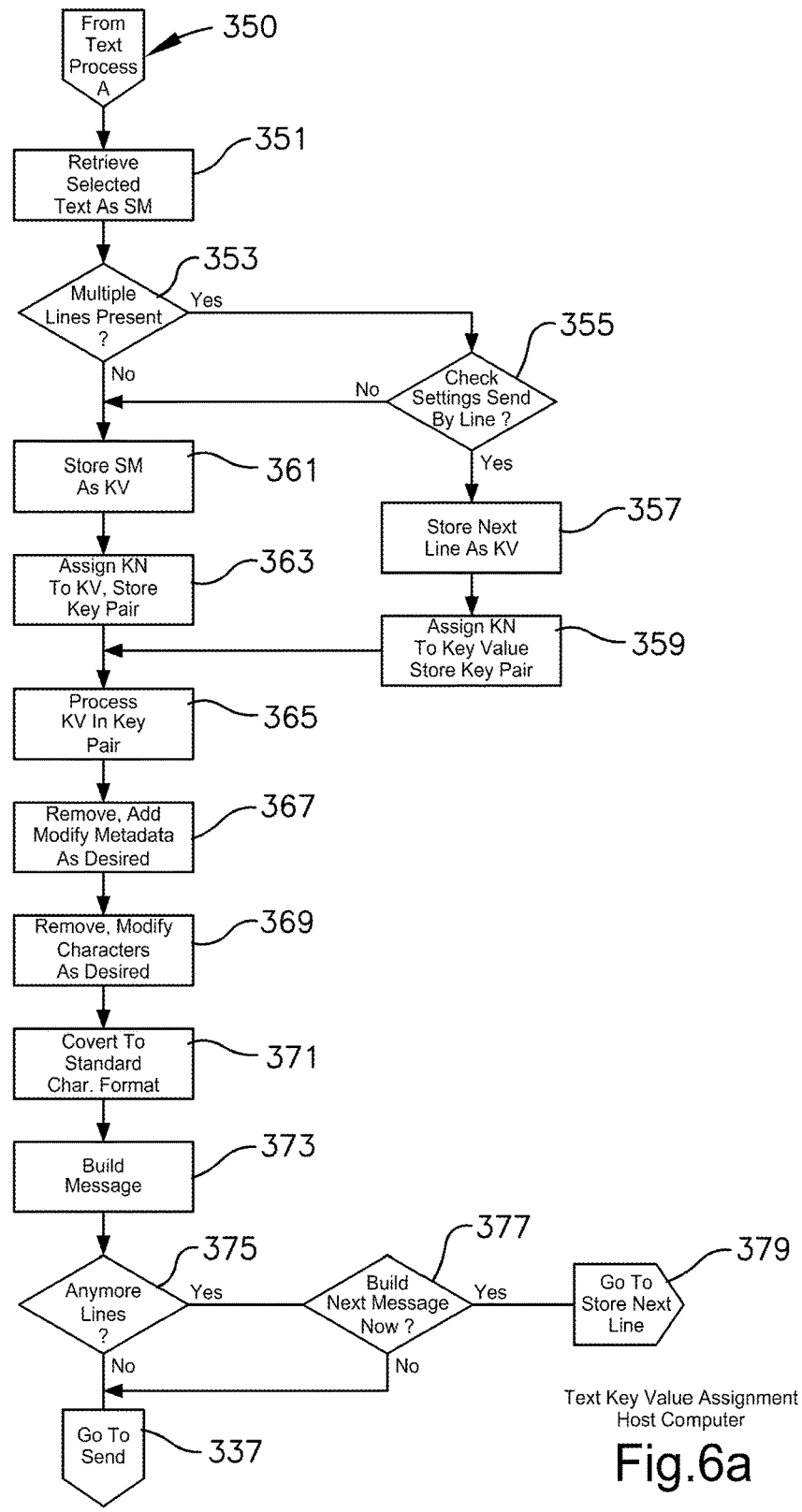
FIG. 6*a* is a flow chart showing the next steps after selection when text is the selected material.
Figure 6B:
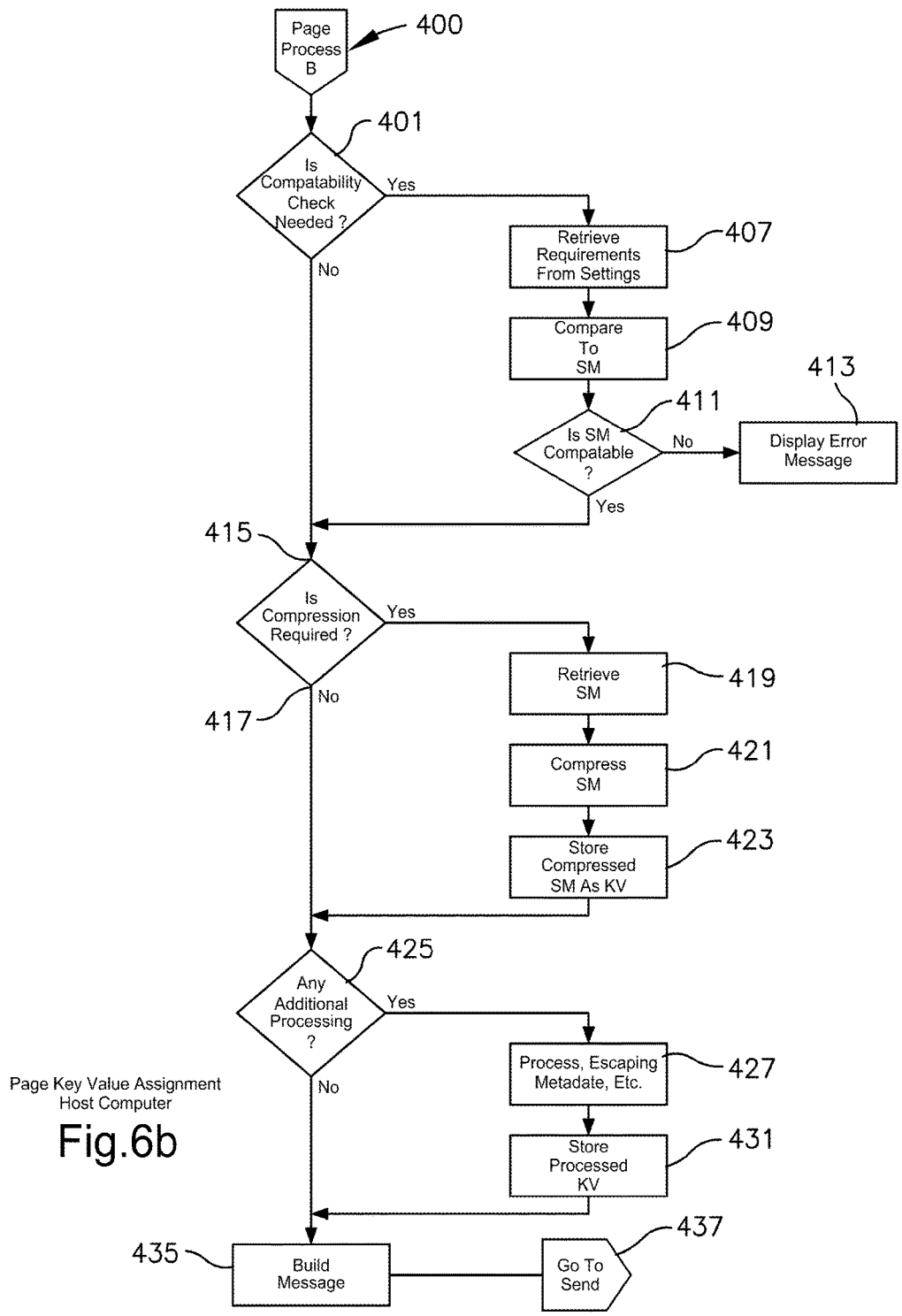
FIG. 6*b* is a flow chart showing the next steps after selection when the background or entire page is the selected material.

When text is selected by the user, the process shown in FIG. 6a is used, starting at 351. In one mode, each line is given a separate key name, instead of the entire text, for reasons convenient to rendering and mixing. This is set in the settings. If such an option is utilized, then the process at 355 is followed and each line is given a separate key name to create separate key pairs, one by one, and processed through 375, then repeated if more lines are in the selected material. (In another mode, each line can be assigned a key value first, i.e. repeated at 357 all lines are assigned key names, before processing each line at 365.

Otherwise, if the answer at 361 is no, then the full text is assigned the desired key name at 363.

Other processing operations might be performed at 365 on the key pair or the key value in the key pair as well before sending. This is based on the user selection from a context menu or other interaction means. If there is more than one selected string being sent then selected key value might depend on the string number currently being considered. The string/text associated with the assigned key value in a key pair is processed such that it is in a format that would be correctly compatible with and usable by the target computer 200 and graphics system 235. It is possible that these formatting steps might also be performed at the graphics system when it receives the key value, and some of these steps might be performed at both locations, the target computer and the host computer. These steps of format adjustments may include one or more of the following, shown at 367, 369, and 371:

1. Pre-process the string to filter out formatting that might not be understood, or might be undesirable by the graphics system. For instance, it is commonly the case that the graphics system is using a "template page" that has font sizes, font types, and font colors pre-configured. These would be removed from the selected text if they were obtained automatically from the browser state memory 101 as part of the selected material, as the template often provides the desire font characteristics, etc.
2. If there are multiple carriage returns in a row, these might be consolidated.
3. Convert the string into a standard character format. A common choice would be to place the string into UTF8 format.

Certain characters present in the selected material may interfere with the communication format used to transmit messages to the graphics system. Such characters are typically 'escaped', or handled by means that are in common use for such purposes. Relevant "escaping" of these characters is likely to be required when before these messages are sent. Meta-data might also be attached to this message. Such metadata might be language, source URL, author name, copyright information and year, and more. Escaping process can be performed here, or in the sending process in FIG. 7.

A message is then built in this mode at 373 (although the message building could start at any time after selection) to send to the target computer. This message would include the key name element to be updated and the key value that it should take, i.e. the key pair. A built message can be sent one at a time, or additional messages built as provided at 377, for instance when the next line message might be built when assigning individual lines.

Figure 7:
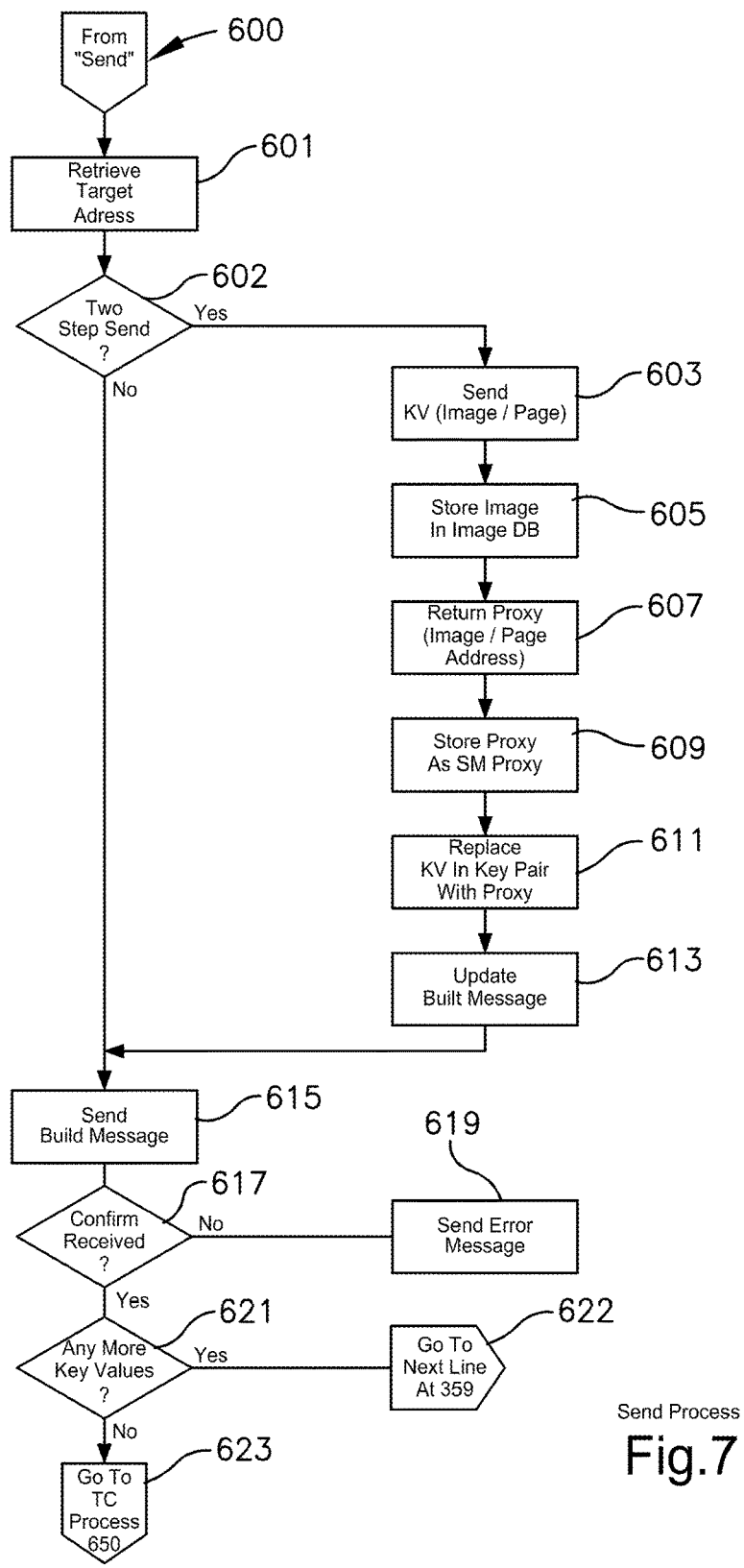
FIG. 7 is a flow chart showing the next step to build and send the message with the key pair information to the target device or system after the selection, assignment, and processing of the key pair.

If the message is built with the desire key pair and processed information, then the message can be sent as shown in FIG. 7. The address of the target computer is recovered at 601 from the plugin settings and included. The option at 602 to send in a two-step process applies to images and pages, not text, at least in this mode. If all context screens and options are complete at 215, the message is sent at 617, or a final screen may provide a final "READY TO SEND" message or the like, at which time the built message is sent to the communications interface to send.

The message is sent in the desired communications protocol. In one mode, this is as an XML string over TCP/IP, or in the alternative as an HTTP "POST" command. For instance a message might be sent as:

<data_update key="name" value="Andrew Cross"/>

In an alternative mode, it could be sent in a query to an HTTP server. For instance, the following HTTP "GET" command:

http://graphicssystem:port/v1/
data_update?name=Andrew %30Cross

It is possible that other forms or protocols of transmission between the systems might be used. For instance, a raw TCP/IP connection might be used, the data might be shared using a file-system or the browser plugin might interact directly with a destination database, inserting the data directly within it.

In one mode the communications module allows for the target computer to return a 'success' message at 621 if successfully received.

If there are more lines to send as noted at 622, then the process is repeated with the next key line at 357. (If all lines have been built with separate messages, then the next built message would be sent starting at 615 and repeated until all built messages are sent, not shown).

Interacting with Graphics Page Itself

When the user chooses to send an entire graphics page into the graphics system, which in one mode is done by right clicking the mouse while on the background, the following steps are utilized:

1. First a compatibility check is performed if needed at 405. This could be prohibited or limited formats for example. This is compared with the host plugin settings. If not compatible, an error message is displayed.
2. Next, further processing, such as compression if required in the settings, is performed at 415 and 425. As indicated previously, escaping can be performed here or in the sending process.
3. Next, the message is built as before with the key pair, including the currently processed page as the key value. However, in the two-step process envisioned, this key value will be replaced with a key value proxy in the sending process, as will be seen.

The built message is ready for the send process, FIG. 7, at 601. First the address of the target device is recovered from the plugin settings as before with text as selected material.

Next, at the request of the user by pressing a SEND command, the image is transferred to the target computer or other target device by one of the following methods, most likely by binary data transfer. This is transmitted either directly in the built message at 615 to the target computer into the key value database 230, in one step, as discussed above with text, or at 603 using two steps to send the image using one of the following methods and store it with an address as an intermediate identifier (as a selected material proxy instead of the selected material itself), to store the processed image at another device, while the key value is replaced with a key value proxy in the key pair to be sent.

Sending the image is the first step and is done in one of several ways to store the image (605) in a remote database, in this case the image storage database 232 in the target computer:

1. Direct network shared file system access using any network protocol such as WINDOWS FILE SHARING by MICROSOFT, that typically provides in return message a unique intermediate identifier that identifies the file and where stored, for the plugin to use in the next step (name_A, for example).
2. An HTTP POST command of the image data, which will typically return a unique identifier that the plugin would use in the next step (name_A).
3. A TCP/IP transfer of the raw image data is sent, which will typically return a unique identifier, proxy, showing the address of the image in the target computer or remote database, that the plugin would use in the next step (name_A).
4. Other transfer protocols may be used.

The unique identifier is then returned from the target computer (607), stored as a proxy key value, and the key value in the key pair is replaced with this proxy key value (611) and the built message updated (613). Thus this step requires the reassignment of the key name to the key value proxy, i.e. the creation of the key pair at this stage, if not done already, where the key value will be the unique identifier acting as the selected material (key value) proxy, or if the key pair is created, replacing the image in the key pair with the unique identifier address (key value proxy). Once the key pair is complete, the built message is created with it, and can be sent at 615 in a number of different methods.

1. It could be sent as an XML string over TCP/IP, or an HTTP "POST" command. For instance a message might be sent as:

<data_update key="webimage" value="name_A"/>
2. It might be sent in a query to an HTTP server. For instance, the following HTTP "GET" command:

http://graphicssystem:port/v1/
    data_update?name=name_A

A success message might be returned in the data that is returned from the command.

It will be clear from the disclosure hereafter that it is also possible to use the URL of the page as is done next with the image.

Interacting with Graphics Element (Image) on a Page.

Figure 6C:
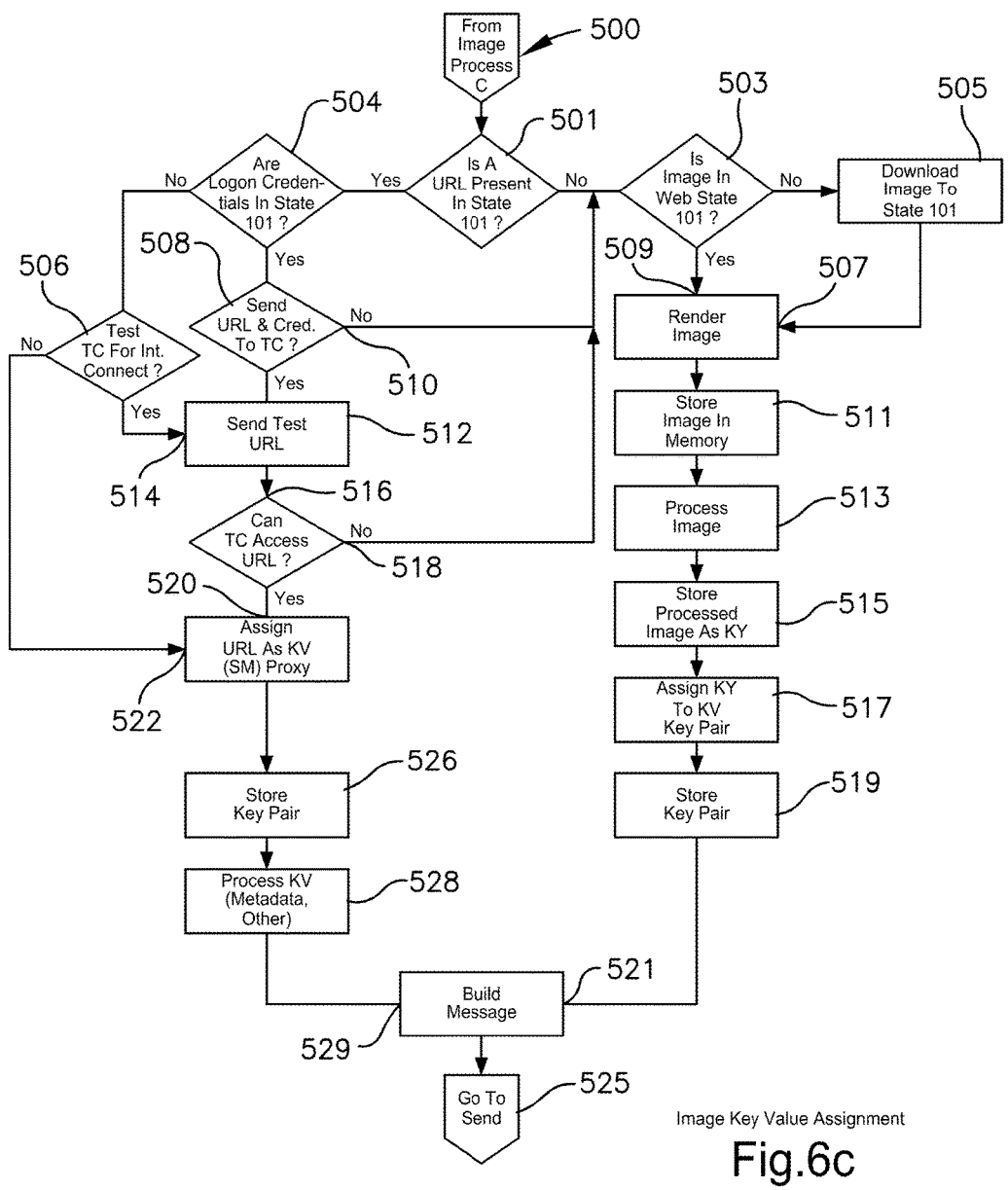
FIG. 6*c* is a flow chart showing the next steps after selection when an image on the webpage is the selected material.

When the user chooses to send a graphics element as the selected material, such as an image, the process shown in FIG. 6c is used.

It is first determined whether the graphics system 235 would be capable of directly accessing the image element as it is displayed within the page through the use of the URL for that image. For instance, on many web pages an image is referred to by a uniform resource locator (URL), which a graphics system might be directly able to read from through the graphics system's independent access to the internet. Such accessibility, or inaccessibility as the case may be, would be noted in the Host Plugin Profile at setup in one mode. In another mode, on each initialization, a test message is sent to the target computer to determine if the graphics package is connected and able to use URL's. In another mode, such a test message is sent at this stage, with a return response, to determine if the graphics system is connected to the internet and able to utilize a URL. If there is no such capability, the next step is not necessary and the image itself would likely need to be sent as indicated below.

Even if the graphics package is able to utilize a URL, it still is possible that the web browser is currently logged into a web-site that requires user credentials in order to read the image URLs on the page. Inasmuch as the graphics system is not also logged in through its internet access, or doing so would be cumbersome, it would also be necessary to instead use the image itself under part b below. Thus it is necessary here to determine if a login or other credential is required, before utilizing the URL. The browser state 101 typically has in memory information about the credentials for the website, showing whether a user is logged in for example. In the alternative, it is also typical to check the URL carrier which may contain credential requests. Thus the host plugin will typically read from the browser state memory the status of website login, or such other similar information stored by the browser to determine or verify whether credentials are required, and if the answer is in the affirmative, then the URL process hereafter will not likely be used. However, the login information might be sent to the target computer, or information that allows the graphics system to otherwise login either automatically on receiving the message, or by prompting the user of the graphics system to log its computer into the appropriate website.

It is also possible that certain protocol or encryption settings are available only to the web browser and not the graphics renderer, which might also make the graphics renderer unable to read a URL directly.

Regardless, an option is provided to check for a URL at 501, and go through the steps at 506, 508, 512, and 516, to determine if, at 516, a URL can be sent instead of the image itself, as a key value (selected material) proxy.

If a URL is to be used, the URL is assigned as the key value address at 520, and the key pair is updated at 526, and processed at 528 if needed. It is this proxy information that is to be sent to the graphics system to use to locate the image on the web that it will render into the template and broadcast. If any credentials are to be sent to allow the graphics system to sign on to the website, these are included here also, in one mode, as part of the selected material proxy, although such credentials can be sent in other modes, such as in a separate notification message to the target computer or to the graphics system operator. The selected material proxy then is all or part of the key value for this particular mode using the URL. A selected material proxy refers to any information used in place of the selected material itself that shows where or how to get the selected material or key value to be rendered and/or displayed.

Once it is determined that a URL will be utilized as a selected material proxy the updating of the key pair at 526 includes any metadata pertaining to it, typically retrieved from memory by the host plugin making a program call into the browser 105 to get from the browser webpage state memory 101 the selected image URL and related material. Some browser applications might provide this to the plugin automatically when it is called as a parameter of the user interaction. Thus the URL, its metadata, is the key value, however the key value may be added to or further modified before being sent, as discussed hereafter. The key pair is stored in memory, either 101 or 111.

The selected material proxy itself is then processed as desired at 528. The selected material metadata can be modified, or deleted. Typical escaping can be done to remove and replace characters if not done in the sending process.

The key pair includes the key value as modified. A message is created, typically in processor means 112 that instructs the graphics system to use the referenced URL and any relevant metadata when that URL is used in the template in the graphics renderer. The message includes the updated key pair, and any communications protocol.

The next step is to send the message as shown in FIG. 7 using one step at 602. The address of the target computer, data base processor, graphics system 235, or other target device as desired, is retrieved from the plugin settings in memory at 601, and the built message is sent to the address in one of a number of different methods, including the following:

1. Send to the target computer 200 through communication interface 215 at 122, or if desired, the data base processor 220, the graphics system 235, or other target device desired, as an XML string or other data packet over TCP/IP, or other network protocol, such as an HTTP "POST" command. For instance a message might be sent as:
   <data_update key="webimage" value="http://www.newtek.com/image/TriCaster.jpg"/>
2. It might also be sent in a query to an HTTP server on the target computer. For instance, the following HTTP "GET" command:
   http://graphicssystem:port/v1/data_update?name=http://www.newtek.com/image/TriCaster.jpg
3. Other protocols for communicating may be used.

In one mode, a success message returned to the host computer is displayed on screen of the host computer. A failed message would indicate that the system might not be set up correctly or that another fault needs to be investigated. The user could return to the host plugin setup menu.

In any method for creating the message, the key value database 230 may be remote external to the target computer 200, and communicated with through its own database processor similar to 220, and may be sent directly into such a remote key value database system, or even to the graphics system 235 directly such as to the Page Render Processor 260, or to any other accessible devices on a network connected by network communication means to the host computer that might need or store the key pair information in the process described herein. The target device is whatever is loaded in the host plugin at setup for IP addresses that has appropriate corresponding receiving hardware for receiving a key/value pair), and could be more than one.

If the URL method for sending image information is not available at 503 in FIG. 6c, the image must be sent, although it still may be sent first in the two step sending process). This is commenced at 503:

1. First determine if the image is in storage or web state (if not, download the image from the web to web state 101). Retrieve the image.
2. Direct the browser to render the image at 509.
3. Store the rendered image in memory. (511).
4. Process the rendered image (processing, as in other modes discussed, can be done any time prior to sending). The image can also be compressed if desired. It can be sent uncompressed or compressed also, either in its native format or not as desired.
5. The processed image is then retrievably stored as the key value in this mode, although it could be sent without assignment in the two step sending process).
6. Assign the appropriate key name with which the key value is to be paired, corresponding with the key name's use in the template in the graphics system, creating a key pair stored in memory. If a two-step proxy process is used in sending, this step may be delayed in lieu of assigning a selected material proxy using the intermediate identifier (proxy) as the key value proxy.

7. A message is built (521).

The image message is now ready to send as set forth in FIG. 7, by either the one or two step process. The address of the target device is recovered from the plugin settings. The image is then, as before at the request of the user by pressing a SEND command example, transferred to the target computer or other target device. This is transmitted either directly to the target computer into the key value database 230, in one step, as discussed above, or using one of the two methods discussed above for sending a graphics page image (either directly, or storing elsewhere and returning a unique identifier proxy). As before, if sent in the two-step process, the key pair is revised to replace the key value with a key value proxy.

Figure 8:
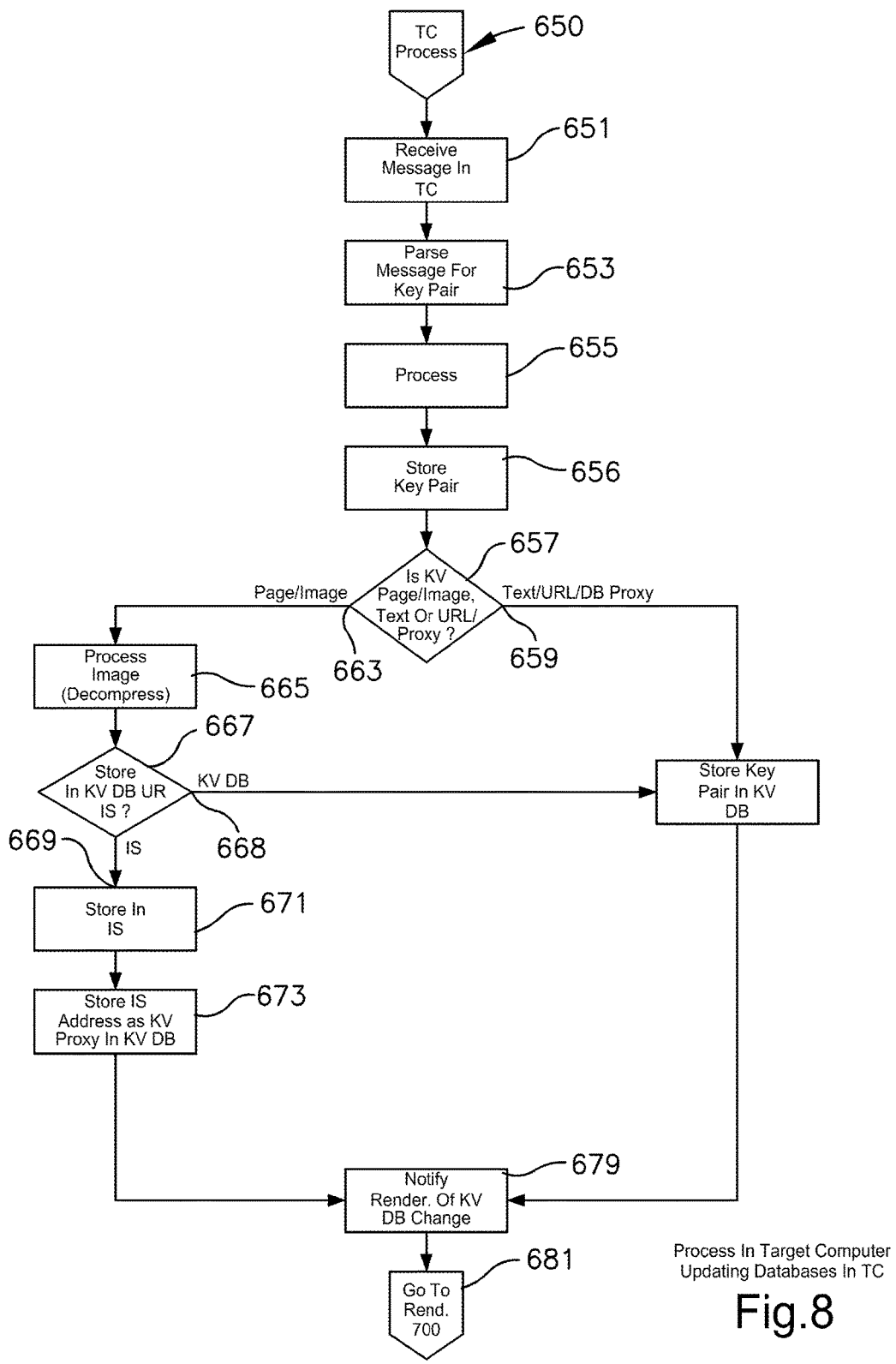
FIG. 8 is a flow chart of the next steps showing the first process steps to update the Key Value database in the target system upon receipt of the message sent from the host system.

Although not required, a success message may be returned in the data that is returned from the command Process in the Target Computer Upon Receipt Once sent, the message is received in the target system 200 as shown in FIG. 8 at 650. The graphics rendering program in processor 260 can either monitor the respective processor 220 and/or key value database 230 for changes, or it can be notified by the data processor 220 that a change has occurred and retrieve the new key values from the database 220. In one mode the monitoring by the renderer is done by constant reading of the database for existing key values, regardless of whether they have changed, and rendering the all key values read, thus assuring the pickup of any changed key values.

In this mode, the target computer communications interface 215 will receive the built message from the host computer and store it in a local buffer typically within the communications interface. The message is then parsed (651) to extract a key pair, including at minimum at least one of the following:

1. One key name and associated key value, which might be either the selected material (which might be a raw text string, formatted text string, or image data or other types, processed or unprocessed, with pertinent data such as certain meta data) or selected material proxy (URL reference, image reference unique identifier in b and c above).
2. Other control meta-data.
3. Other data that might later be associated with a key value.
4. An indication that some other form of transfer has been initiated (e.g. an operation on a shared drive system).

The key pair and information is then processed, by undoing any escaping for example (655), if not already performed when received. Other typical possible post processing is performed as desired, such as checking data, invalid character removal, error checking, or reformatting data. If any errors are detected or the message is not as needed, a return message to the host computer can be sent that the message was rejected, or if acceptable, a confirmation is sent.

It is also envisioned that the key pair could be stored separately but recoverable as an associated key pair.

It must then be determined what type of key value is in the key pair at 657.

If the key value includes text, or any selected material, then the processed key value is stored (659) with the key name as the key pair in the key value database 230. If it includes a selected material proxy, then that is stored as the key value proxy for the key pair (659).

If the selected material is an image, the image is parsed. If the image was compressed before sending, decompression and format conversion occurs.

If the selected material is an image then the image can also be stored separately in the image storage database 232 as an external reference source (which database might be external to the target computer), with the address for the image a local selected material proxy provided as the key value. This might be desired inasmuch as images are more easily utilized by a renderer processor when stored in certain types of database formats more suitable for storing and retrieving images that might not be used in the key value database formats used. Thus here, the image is stored and given a unique identifier as discussed previously, and which identifier becomes a local selected material proxy for the selected material (image). That identifier, the local selected material proxy, is the key value and will be used by the graphics system to locate and retrieve the image for rendering. In this case, the database update of key pairs occurs at the same time as image transmission of the image.

Figure 9:
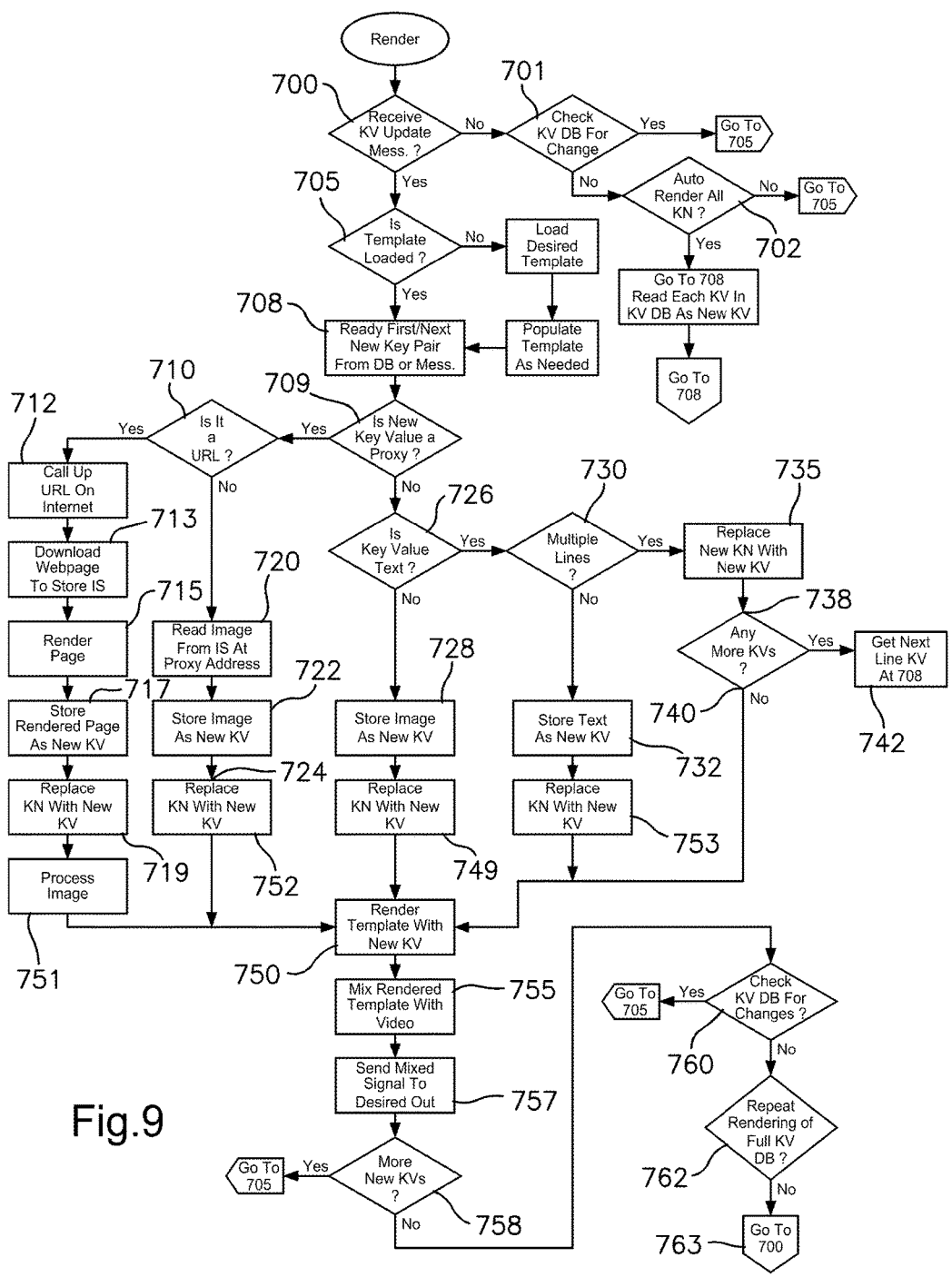
FIG. 9 is a flow chart of the final steps to read and/or locate the selected material, process it, render it and mix it to a video output signal.

Thus, if it is desired to store the image in the key value database 230, then that is stored there (668). If it is desired to store the image in the image storage 232, then that is stored (673). The key value database is considered to be updated, ready for the next renderer read of it, or the update can be sent. In this mode, the renderer is notified of that the key value database has been updated (681). The next step is for the renderer to update the template and finish the process, 700. This is shown in FIG. 9, starting with 705.

It should be understood that a template may be called up at any time by the graphics processor from the page template database 250 and rendered. In either case, the current key values for the key names, of which there is at least one, must be obtained. For an initial use of a template, the processor will query, i.e. retrieve from the key value data base the key value for the key name in the template, without any prodding or message necessarily from the data processor 220. It should also be known that more than one template may be being used and rendered by the graphics system at any one time. Thus it is necessary to update key values as the host computer sends them, in all templates.

The graphics system software determines which templates need updating for new key value information, acquires the new key value, processes any images as discussed further below, then updates the key values in the templates and re-renders them. Determining the key values to change is done in one of the following ways:

1. The graphics system is notified of an update at 700, in FIG. 9, without specifics, typically done by the processor 220, or the key value database 230 notifying the render processor 260. (If no message is received, the render processor may check the key value database at 701, or it may check at regular intervals, as periodic or essentially continuous monitoring at 702 and read each key value for each relevant key name in a currently used template, or even all key names in the database, and reinsert key values in templates and re-render, whether the key values are new key values or not). At 705, the template (s) if not already loaded and in use, is loaded.
2. The data processor 220 in this mode notifies the graphics system which key names have key values that have been updated. The graphics system would then update all template pages, preferably those in use, which have the respective key name (708).
3. The graphics system could cache the current template and/or page(s) in memory and poll the key value database 230 at regular intervals and compare the current key value against the cached page to determine if the template key value has changed and needs to be updated, in which case the cached page could be updated, rendered and replace the current rendered page, or other steps are taken to update the current rendered pages with the updated key values.

For any key name that has a key value that is a selected material proxy (key value proxy) stored in the key value database rather than the image or URL itself, the additional steps of retrieving the image is necessary, starting at 710. Otherwise, if it is text or an image the respective key values are used to replace their key names in the templates at 735, 732,728 and re-rendered at 750.

If the key value is a proxy, then if it is a URL at 712, the renderer uses the URL to access the internet through the target computers own communication interface, and logs on to that URL page and downloads the image (713) then renders that page (715), stores it (717) as a new key value and replaces the respective key name that the proxy was associated with, with the new image key value (719), and renders that (750).

If the proxy is an address for an image stored in the Image Source 232, that address is used by the render processor 260 (or the processor 220) to read the image at 232, stores that image as the key value for the respective key name that was associated with the key value proxy.

The image for the key value may also be processed for compatibility before rendering such as is shown at 751. Here it is converted by the processor 220 or 260 to a compatible pixel format for rendering, then scaled to fit the appropriate location on the page based on page information that might include any manner of image description properties including aspect ratio, scaling limitations, scale fitting settings.

This process is repeated for all elements on the template typically before rendering. When the template is complete the page will be rendered with the template and mixed in video mixer 280 as needed or desired, with video signals from video source 70 through video demux 260, sent to be displayed and/or broadcast via program output 300. It is possible that the page might be displayed on output before all elements are complete.

It should be understood that for each of the processes and flow charts described, a set of common software instructions in the necessary computer code compatible with a computer and the identified hardware and associated software can be written to carry out these new processes described herein.

It should be apparent that a method for selecting a variety of formatted data in real time, regardless of the format whether it be text, graphics, or other format, is shown for automatically reinserting into a target template for use and manipulation, particularly in a live video production environment.

All modules, and components identified as software modules, or set of software instructions, refers to a set of software code and instructions in any desired software code language, created to carry out steps, which code may be called into memory means of a device having such means (including a computer), and including processor means to manipulate data in that device having such processor means, in part or whole as needed, to operate within the device in the language of the operating system and software used by that device, and operate according to the instructions of the device whether automatic as part of the device operating software, or in response to operator input through the keyboard or other input means that might control the device.

As used herein, a computer system refers to a system having processing means for operating according to software instructions, memory means for retrievably storing data, operator input means such as but not limited to a keyboard and/or touchscreen, communications means for connecting to an intranet or internet including communications software for encoding and decoding information in a format suitable for transmitting and/or receiving information pursuant to the protocol of the intranet or internet being utilized, and output means for displaying desired information in any desired video format, such as an LCD display. It may also have storage means to permanently record data, such as a disk drive for retrievably storing data after power is turned off.

Standard communications port on a device or computer refers to standard available hardware with software able to send and receive data in a known format with other computers and devices using the same or similar format and/or protocol, such as a standard Ethernet hardware port with embedded software using standard Ethernet communications protocol.

Thus what has been shown is a method and apparatus for effectively and quickly inserting images, pages, or text as it is selected from a web page to be inserted directly, nearly on the fly, into predetermined templates essentially live broadcast.

I claim:

1. A method for incorporating web page based selected material into a broadcast image at a video output essentially in real time, or subsequently thereto as desired, upon selection of the selected material, in a system having a computer with a processor, memory, storage means, display means, input/output means, software to operate the computer, including a web browser software for viewing internet web pages, graphics rendering software, template database storage means, and video mixer for mixing signals to display a mixed video signal at a video output, said method comprised of the steps of:
   a. Selecting material from a web page displayed on the display means to be selected material;
   b. Retrievably storing said selected material in memory to create a new key value consisting of at least some of the selected material;
   c. Assigning a predefined key name to the new key value to create a new key pair;
   d. Retrievably storing the new key pair;
   e. Retrieving the new key value in the key pair and incorporating the new key value into a predefined template to create a new image for the respective key name in the new key pair, so as to allow the rendering of the new image with the new key value in accordance with a respective predetermined key name;
   f. Rendering the said new image with the new key value so as to create a rendered image with the selected material included as desired;
   g. Mixing the rendered image with a video signal to create a video signal having the selected material included.

2. A method for incorporating web page based selected material into a broadcast image at a video output essentially in real time, or subsequently thereto as desired, upon selection of the selected material, in a system having a computer with a processor, memory, storage means, display means, input/output means, software to operate the computer, including a web browser software for viewing internet web pages, graphics rendering software, template database storage means, and video mixer for mixing signals to display one or more mixed video signals at one or more video outputs, said method comprised of the steps of:
  a. Selecting material from a web page displayed on the display means to be selected material;
  b. Retrievably storing said selected material in memory to create a new key value consisting of at least some of the selected material;
  c. Assigning a key name to the new key value to create a new key pair;
  d. Retrievably storing the new key pair;
  e. Retrieving the new key value in the key pair and incorporating the new key value into a predefined template preset to receive a key value in the template associated with said new key name, so as to allow the rendering of a new image with the new key value included in said new image;
  f. Rendering the said new image with the new key value so as to create a rendered image with the selected material included as desired;
  g. Mixing the rendered image with a video signal to create a video signal having the selected material included.

3. A method for incorporating web page based selected material into a broadcast image at a video output essentially in real time, or subsequently thereto as desired, upon selection of the selected material, in a system having a computer with a processor, memory, storage means, display means, input/output means, software to operate the computer, including a web browser software for viewing internet web pages, graphics rendering software, template database storage means, and video mixer for mixing signals to display one or more mixed video signals at one or more video outputs, said method comprised of the steps of:
  a. Selecting material from a web page displayed on the display means to be selected material;
  b. Retrievably storing said selected material in memory to create a new key value consisting of at least some of the selected material;
  c. Assigning a key name to the new key value to create a new key pair, where the key name corresponds to a predetermined corresponding key name associated with a predefined template stored in the graphics template database, such that when said new key values in the image template associated with the key name are replaced by the respective key value data associated with a key name, rendered with the template, and then mixed with a video signal, the resulting video output shows the selected material as desired;
  d. Retrievably storing the new key pair in a key value database;
  e. Retrieving the new key value in the key pair and incorporating the new key value into the predefined template in the manner predetermined for the respective key name in the new key pair;
  f. Rendering the said image template with the new key value so as to create a rendered image with the selected material included as desired;
  g. Mixing the rendered image with a video signal to create a video signal having the selected material included.

4. A method for incorporating web page based selected material on a host computer into a broadcast image at a video output essentially in real time on a target computer, or subsequently thereto as desired, upon selection of the selected material, in a system having a host computer with a processor, memory, storage means, display means, input/output means, communication means, software to operate the computer, including a web browser software, and a target computer having a video mixer, a processor, memory, input/output means, communication means, software to operate said target computer, including graphics rendering software, and mixer software for mixing signals to display as one or more output video signals at one or more video outputs, said method comprised of the steps of:
  a. Selecting material from a web page displayed on the host computer display means to be selected material;
  b. Retrievably storing said selected material in memory to create a new key value consisting of at least some of the selected material;
  c. Assigning a key name to the new key value to create a new key pair;
  d. Sending the new key pair to the target computer via a message sent to said host computer communications means;
  e. Receiving said message at the target computer and parsing said message to determine the key pair;
  f. Retrievably storing the new key pair in a key value database;
  g. Retrieving the new key value in the key pair and incorporating the new key value into a predefined template to create a new image for the respective key name in the new key pair, so as to allow the rendering of the new image with the new key value in accordance with a respective predetermined key name;
  h. Rendering the said new image with the new key value so as to create a rendered image with the selected material included as desired;
  i. Mixing the rendered image with a video signal to create a video signal having the selected material included.

5. A method for incorporating web page based selected material on a host computer into a broadcast image at a video output essentially in real time on a target computer, or subsequently thereto as desired, upon selection of the selected material, in a system having a host computer with a processor, memory, storage means, display means, input/output means, communication means, software to operate the computer, including a web browser software, and a target computer having a video mixer, a processor, memory, input/output means, communication means, software to operate said target computer, including graphics rendering software, and mixer software for mixing signals to display as one or more output video signals at one or more video outputs, said method comprised of the steps of:
  a. Selecting an image from a web page displayed on the host computer display means to be selected material;
  b. Retrievably storing said selected material in memory having an address for the location of that image and retrievably storing said address as a proxy new key value
  c. Assigning a key name to the proxy new key value to create a new key pair, where the key name corresponds to a predetermined corresponding key name in a predefined image template stored in the graphics template database, which template is predesigned with key names located in the template in a desired manner such that when said key names are replaced by the selected material obtained with the proxy new key value, rendered with the template, and mixed with a video signal, the resulting video out shows selected material as desired;
  d. Sending the new key pair to the target computer via a message sent to said host computer communications means;
  e. Receiving said message at the target computer and parsing said message to determine the key pair;

f. Retrievably storing the new key pair in a key value database;
g. Retrieving the proxy new key value in the key pair to determine how to locate the selected material at the proxy using the proxy new key value;
h. Retrieving the selected material using the proxy new key value based on the information provided by the proxy new key value;
i. Incorporating the new key value into the predefined image template in the manner predetermined for the respective key name in the new key pair, so as to allow the rendering of the image template with the new key value in accordance with the respective predetermined key name;
j. Rendering the said image template with new key value so as to create a rendered image with the selected material included as desired;
k. Mixing the rendered image with a video signal to create a video signal having the selected material included.

6. A method for incorporating web page based selected material on a host computer into a broadcast image at a video output essentially in real time on a target computer, or subsequently thereto as desired, upon selection of the selected material, in a system having a host computer with a processor, memory, storage means, display means, input/output means, communication means, software to operate the computer, including a web browser software, and a target computer having a video mixer, a processor, memory, input/output means, communication means, software to operate said target computer, including graphics rendering software, and mixer software for mixing signals to display as one or more output video signals at a video output, said method comprised of the steps of:
a. Selecting an image from a web page displayed on the display means to be selected material;
b. Determining if said image is retrievable utilizing a URL, and if so, retrievably storing the URL for that selected material in memory as a proxy new key value;
c. Assigning a predefined key name to the proxy new key value to create a new key pair, where the key name corresponds to a predetermined corresponding key name in a predefined image template stored in the graphics template database, which template is predesigned with key names located in the template in a desired manner such that when said key names are replaced by selected material obtainable utilizing the proxy new key value, rendered with the template, and mixed with a video signal, the resulting video out shows selected material as desired;
d. Sending the new key pair to the target computer via a message sent to said host computer communications means;
e. Receiving said message at the target computer and parsing said message to determine the key pair;
f. Retrievably storing the new key pair in a key value database;
g. Retrieving the proxy new key value in the key pair to determine the URL for locating the new key value image;
h. Retrieving the selected material utilizing the URL and Rendering the said template with the selected material located by the URL so as to create a rendered image with the selected material included as desired;
i. Mixing the rendered image with a video signal to create a video signal having the selected material included.

7. The method in claim 1, 2, 3, 4, 5 or 6 having the additional step of monitoring for changes in new key pairs and for each change incorporating such changes in key values into the image template, rerendering said image template, and mixing the rendered image into the video signal to be broadcast.

8. The method in claim 1, 2, 3, 4, 5, or 6 having the additional step of monitoring for changes in new key pairs and for each change in key values incorporating such changes into the image template, rerendering said image template, and mixing the rendered image into the video signal to be broadcast, and where the monitoring is comprised of monitoring the key value database memory for changes to key pairs by continuously reading all key pairs and processing all key values in key pairs so as to continuously utilize the respective current key values for each respective key name in the key pair that has an associated key name in the predesigned template.

9. The method in claim 1, 2, 3, 4, 5, or 6, having the additional step determining of the selected material of determining the type of selected material as text, image audio, video, or other identifiable type of data type and processing the selected material according to the type as desired.

10. The method in claim 1, 2, or 3 where the selected material is an image and determining whether the image is retrievable by the URL associated with the image.

11. The method in claim 1, 2, or 3, where the selected material is determined to be an image, said image is intermediately retrievably stored in memory accessed using an assigned unique key name to create a proxy key value and where said proxy key value is assigned as the new key value in the new key pair, and where the said proxy key value is used to access the image as the selected material to be used in the image template to be rendered.

12. The method in claim 1, 2, 3, 4, 5 or 6 where the step of selecting the selected data is comprised of selecting at least two lines of text and where each line of text is assigned a unique new key value to create at least two new corresponding new key pairs that correspond to the key values preset in the template, and one or more of the new key values is selected to be rendered in the template according to their respective key names associated with the template.

13. The method in claim 1, 2, 3, 4, 5 or 6 where the key value includes information for any restrictive conditions to be applied to the mixed video signal.

14. An apparatus for selecting and incorporating web page based selected material into a broadcast image at the video output essentially in real time upon selection of the selected material comprised of:
a. Rendering program means for rendering images;
b. Graphics program means including means for rendering images including predesigned templates, and means for creating said predesigned templates having predesignated placeholder names for inserting data that changes where the names are key names and the variable data is key values, together creating associated key pairs;
c. Storage means for storing said predesigned templates having at least one key pair;
d. Video mixing means having at least one video input for receiving a video signal and having means for mixing at least one video input signal with the graphics rendered template to create at least one video output broadcast signal having the combined rendered template and video input signal;
e. Communications means for connecting to the internet;
f. Display means for displaying a web page on the internet;

g. Processing means for selecting at least a portion of the displayed page as selected material to be stored in a memory means;

h. Memory means for retrievably storing the selected material in a manner recoverable so as to associate the selected material with a key name to create a new key pair, where the key name corresponds to a predetermined corresponding key name in a predefined image template stored in the graphics template database, which template is predesigned with key names located in the template in a desired manner such that when said key names are replaced by key value data, rendered with the template, and mixed with a video signal, the resulting video out displays selected material as desired;

i. Processor means to retrieve the new key values from key pairs as needed so as to insert the new key values into the predesigned templates in accordance with the key name in the key pair that is also associated with a corresponding key name in the predesigned template, so as to allow rendering of the template ready to be mixed with a video signal to produce the desired video output signal having the selected material therein.

15. The method in claim 1, 2, or 3 where the selected material is an image retrievable by a URL and using the URL as a new key value in the new key pair, and where the said URL is used to access the selected material to be used in the image template to be rendered.

\* \* \* \* \*